United States Patent [19]

Itoh et al.

[11] Patent Number: 4,468,100
[45] Date of Patent: Aug. 28, 1984

[54] WIDE-ANGLE PHOTOGRAPHIC LENS

[75] Inventors: Takayuki Itoh; Yasunori Arai, both of Tokyo, Japan

[73] Assignee: Asahi Kogaku Kogyo Kabushiki Kaisha, Tokyo, Japan

[21] Appl. No.: 422,502

[22] Filed: Sep. 23, 1982

[30] Foreign Application Priority Data

Oct. 9, 1981 [JP] Japan ................. 56-161448

[51] Int. Cl.³ .................................... G02B 9/64
[52] U.S. Cl. ......................................... 350/463
[58] Field of Search ........................ 350/460, 463

[56] References Cited

U.S. PATENT DOCUMENTS

| 3,874,770 | 4/1975 | Shimizu | 350/460 |
| 4,046,459 | 9/1977 | Kawamura | 350/460 |
| 4,176,914 | 12/1979 | Fujibayashi | 350/463 |
| 4,256,373 | 3/1981 | Horimoto | 350/463 |

FOREIGN PATENT DOCUMENTS

| 54-15734 | 2/1979 | Japan | 350/460 |
| 55-41434 | 3/1980 | Japan | 350/460 |

Primary Examiner—John K. Corbin
Assistant Examiner—Scott J. Sugarman
Attorney, Agent, or Firm—Sughrue, Mion, Zinn, Macpeak and Seas

[57] ABSTRACT

A small-size and high-performance wide-angle photographic lens system of the seven-group-seven-element type including first and second components of negative meniscus lenses with convex surfaces directed to the object, a third component of a positive lens having a large-curvature convex surface directed to the object, a fourth component of a positive lens having a large-curvature convex surface directed to the image, a fifth component of a biconcave negative lens, a sixth component of a positive meniscus lens having a convex surface directed to the image, and a seventh component of a positive lens.

3 Claims, 4 Drawing Figures

WIDE-ANGLE PHOTOGRAPHIC LENS

BACKGROUND OF THE INVENTION

The present invention relates to a wide-angle photographic lens having an aperture ratio of 1:2.8 and a focal length of 28 mm for use in 35 mm photographic cameras. It is an object of the present invention to provide a small-size high-performance lens system having lenses that can easily be shaped and are made of an optical material which can be fabricated with ease and is inexpensive.

Many lens systems of the class described have been known in the art. They can roughly be classified into positive-front-lens systems having a positive first lens component and negative-front-lens system having a negative first lens component. The former lens system is effective for correcting distortions, but has a tendency to cause variations in the curvature of field when the lens system is close to the object. The present invention is directed to a lens system of the latter type, although not of a super-miniaturized size, is an improvement that meets three conditions of compactness, high performance, and low cost.

SUMMARY OF THE INVENTION

According to the present invention, there is provided a small-size and high-performance wide-angle photographic lens system of the seven-component-seven-element type including first and second components of negative meniscus lenses with convex surfaces directed to the object, a third component of a positive lens having a large-curvature convex surface directed to the object, a fourth component of a positive lens having a large-curvature convex surface directed to the image, a fifth component of a biconcave negative lens, a sixth component of a positive meniscus lens having a convex surface directed to the image, and a seventh component of a positive lens.

BRIEF DESCRIPTIN OF THE DRAWINGS

FIGS. 1 and 3 are schematic diagrams showing lens systems according to examples 1 and 2 of the present invention; and FIGS. 2 and 4 are diagrams showing various aberrations of the lens systems according to the examples 1 and 2, in which $r_i$ is the radius of curvature of the i-th lens surface, and $d_i$ is the thickness of the i-th lens or the aerial space between the adjacent lenses.

DETAILED DESCRIPTION OF THE PREFERRED EMBODIMENTS

Figure 1:
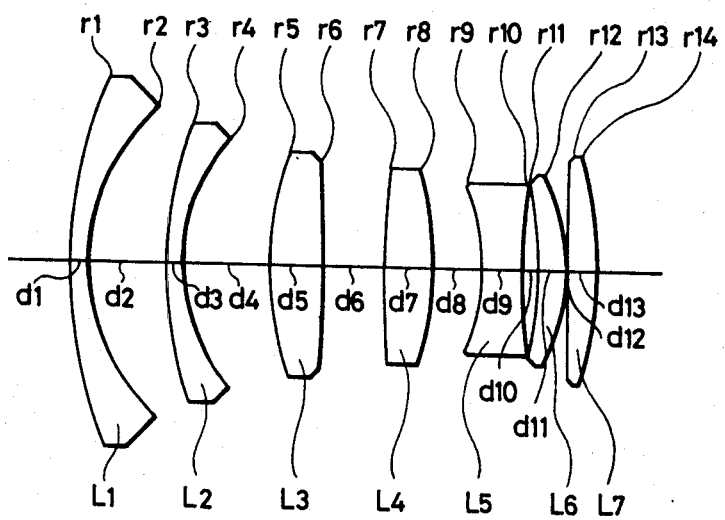
Figure 2:
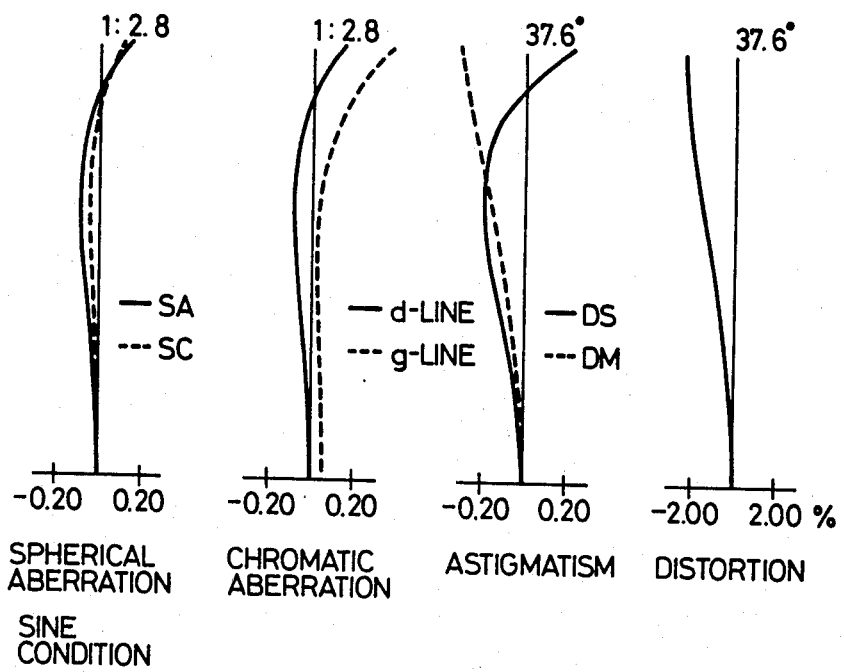
Figure 3:
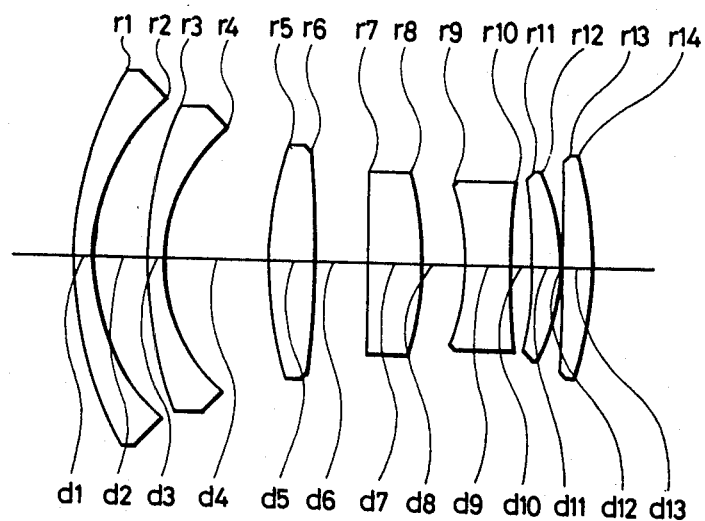
Figure 4:
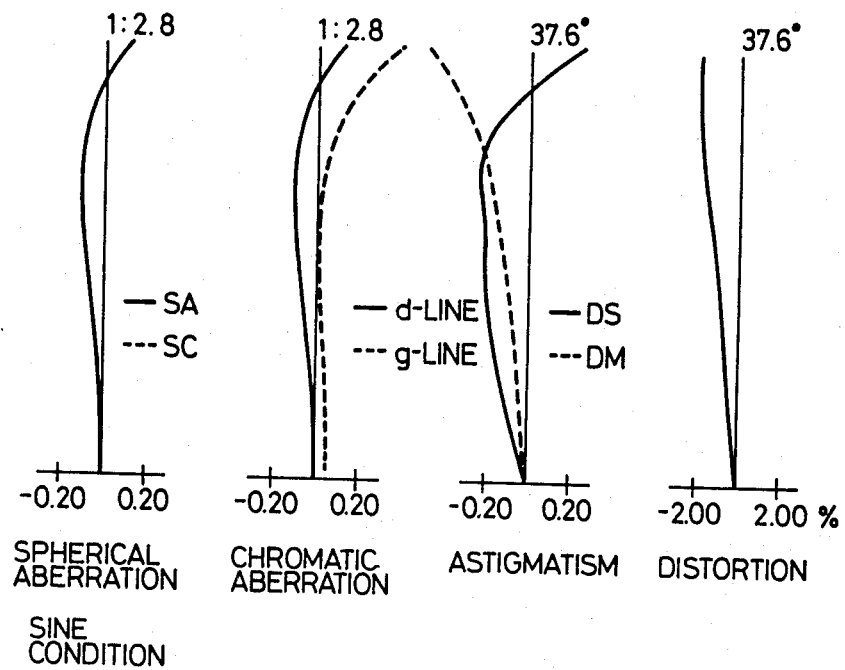

The present invention will now be described in detail in connection with the accompanying drawings.

According to the present invention, there is provided a small-size and high-performance wide-angle photographic lens system of the seven-component-seven-element type including first and second components of negative meniscus lenses $L_1$ and $L_2$ with convex surfaces directed to the object, a third component of a positive lens $L_3$ having a large-curvature convex surface directed to the object, a fourth component of a positive lens $L_4$ having a large-curvature convex surface directed to the image, a fifth component of a biconcave negative lens $L_5$, a sixth component of a positive meniscus lens $L_6$ having a convex surface directed to the image, and a seventh group of a positive lens $L_7$.

The lens system of the invention satisfying the following conditions.

$$-1.4 < \frac{f}{f_{I \cdot II}} < -0.9 \quad (1)$$

$$0.3 < \frac{f_{I \cdot II}}{f_I} < 0.65 \quad (2)$$

$$0.4 < \frac{d_1 + d_2 + d_3 + d_4}{f} < 0.8 \quad (3)$$

$$1.5 < \frac{N_I + N_{II}}{2} < 1.6 \quad (4)$$

$$1.0 < \frac{f}{f_{I-IV}} < 1.5 \quad (5)$$

$$0.4 < \frac{f_{III \cdot IV}}{f_{III}} < 0.75 \quad (6)$$

$$0.7 < \frac{r_5}{f} < 1.3 \quad (7)$$

$$0.02 < \frac{d_{10}}{f} < 0.1 \quad (8)$$

where
f is the focal length of the overall lens system,
$f_{I \cdot II}$ is the resultant focal length of the first and second components,
$f_I$ is the focal length of the first component,
$d_i$ is the thickness or spacing of the i-th lens,
$N_I$, $N_{II}$ are the refractive indexes of the first and second components at d-line,
$f_{I-IV}$ is the resultant focal length of the first through fourth components,
$f_{III \cdot IV}$ is the resultant focal length of the third and fourth components,
$f_{III}$ is the focal length of the third component, and
$r_i$ is the radius of curvature of the i-th lens surface.

The lens system of the present invention is of the retrofocus type including a front component of two negative meniscus lenses $L_1$ and $L_2$, an intermediate component of two positive lenses $L_3$ and $L_4$, and a rear component of a biconcave negative lens $L_5$ and two positive lenses $L_6$ and $L_7$. The conditions (1), (2), (3) and (4) are related to the front lens component, the conditions (5), (6) and (7) to the intermediate lens component, and the condition (8) to the rear lens component.

If the upper limit of the condition (1) were exceeded, aberrations could easily be compensated for, but miniaturization of the lens system could not be achieved. With the lower limit of the condition (1) being exceeded, the negative power of the front component would be increased and the radii ($r_2$, $r_4$) of curvature of the rear surfaces of the first and second components would become small. Thus, lens fabrication would be more difficult thus failing to construct the lens system less costly, and the curvature of the field undergoes increased variations when the lens system is close to the object.

The condition (2) is required to balance the distribution of lens powers or refractive powers among the first and second components in the front component. If the front lens component exceeded the upper limit of the condition (2), the negative power of the first component would be too increased. Conversely, if the front lens component went below the lower limit of the condition (2), the negative power of the second component would be increased excessively. The radii ($r_2$, $r_4$) of curvature of the rear surfaces of the lenses would then become small, resulting in the foregoing problems.

If the upper limit of the condition (3) were exceeded, the lens system could not be small in size, and if the lower limit thereof were exceeded, the negative power of the front lens component would be increased for maintaining a backfocus, an arrangement which is not desirable.

If the upper limit of the condition (4) were exceeded, the cost of optical material used would become high, and the optical material would be poor in abration properties such as acid resistance, water resistance, and the like, with the result that the lens system could not be fabricated at a low cost. If, on the other hand, the lower limit were exceeded, a difficulty would arise for the correction of the aberrations, and hence high performance of the lens system would not be achieved.

If the lens system went beyond the upper limit of the condition (5), it could be made compact in size, but the negative power of the rear lens component should be increased for a backfocus, with the consequence that the curvature of field and coma could not be compensated for with ease. With the lower limit exceeded, the lens system would be enlarged in size.

The condition (6) serves to distribute lens powers among the third and fourth components in balanced relation in the intermediate lens component. If the upper limit of the condition (6) were exceeded, the positive power of the third component would be too strong. If the lower limit of the condition (6) were exceeded, the power of the fourth component would be too strong. Therefore, the radius ($r_5$) of curvature of the front surface of the third component or the radius ($r_6$) of curvature of the rear surface of the fourth component would become too small for thereby generating aberrations of higher degree. It would then be difficult to compensate for the spherical aberration.

The condition (7) is related to the condition (6). If the upper limit of the condition (7) were exceeded, aberrations produced by the two negative meniscus lenses in the front component would not be cancelled out, and if the lower limit exceeded, the aberrations would be compensated for overly, and aberrations of higher degree would be produced.

The wide-angle lens of the type described has a tendency for astigmatism in the direction of sagittal in an intermediate angle of view to be under and for astigmatism in the direction of sagittal in a maximum angle of view to be over. The condition (8) serves to compensate for such a difficulty. If the upper limit of the condition (8) were exceeded, the above difficulty would be amplified, and if the lower limit were exceeded, the fifth and sixth components would interfere with each other, a situation which would be physically impossible.

Numerical values for Examples 1 and 2 according to the present invention will be described below. Designated at f is the focal length, $\omega$ the half view angle, $f_B$ the backfocus, r the radius of curvature, d the thickness of lenses or aerial space between adjacent lenses, N the refractive index with respect to d-line, and $\nu$ the Abbe number.

EXAMPLE 1

| | | aperture ratio 1:2.8 f = 28.78   $\omega$ = 37.6°   $f_B$ = 36.79 | | | |
|---|---|---|---|---|---|
| | No. | r | d | N | $\nu$ |
| $L_1$ | 1 | 38.000 | 1.40 | 1.58913 | 61.0 |
| | 2 | 16.614 | 6.46 | | |
| $L_2$ | 3 | 34.000 | 1.30 | 1.51633 | 64.1 |
| | 4 | 14.850 | 7.17 | | |
| $L_3$ | 5 | 25.674 | 4.50 | 1.70000 | 48.1 |
| | 6 | −151.327 | 4.62 | | |
| $L_4$ | 7 | 94.860 | 4.75 | 1.65844 | 50.9 |
| | 8 | −28.090 | 4.00 | | |
| $L_5$ | 9 | −17.929 | 3.33 | 1.76182 | 26.6 |
| | 10 | 48.280 | 1.19 | | |
| $L_6$ | 11 | −33.552 | 2.40 | 1.69350 | 53.2 |
| | 12 | −16.160 | 0.10 | | |
| $L_7$ | 13 | −1141.732 | 2.50 | 1.69350 | 53.2 |
| | 14 | −30.500 | | | |

$$\frac{f}{f_{I\text{-}II}} = -1.186$$

$$\frac{f_{I\text{-}II}}{f_I} = 0.47$$

$$\frac{d_1 + d_2 + d_3 + d_4}{f} = 0.567$$

$$\frac{N_I + N_{II}}{2} = 1.553$$

$$\frac{f}{f_{I\text{-}IV}} = 1.302$$

$$\frac{f_{III\text{-}IV}}{f_{III}} = 0.597$$

$$\frac{r_5}{f} = 0.892$$

$$\frac{d_{10}}{f} = 0.041$$

EXAMPLE 2

| | | aperture ratio 1:2.8 f = 28.63   $\omega$ = 37.6°   $f_B$ = 36.80 | | | |
|---|---|---|---|---|---|
| | No. | r | d | N | $\nu$ |
| $L_1$ | 1 | 30.000 | 1.52 | 1.58913 | 61.0 |
| | 2 | 17.006 | 4.53 | | |
| $L_2$ | 3 | 32.000 | 1.40 | 1.51633 | 64.1 |
| | 4 | 14.000 | 8.55 | | |
| $L_3$ | 5 | 29.920 | 3.83 | 1.74400 | 44.7 |
| | 6 | −103.398 | 4.36 | | |
| $L_4$ | 7 | −460.000 | 4.40 | 1.74400 | 44.7 |
| | 8 | −27.625 | 3.66 | | |
| $L_5$ | 9 | −18.660 | 3.66 | 1.80518 | 25.4 |
| | 10 | 56.177 | 1.73 | | |
| $L_6$ | 11 | −42.690 | 2.40 | 1.69680 | 55.5 |
| | 12 | −16.750 | 0.10 | | |
| $L_7$ | 13 | −487.370 | 2.50 | 1.69350 | 53.2 |

-continued aperture ratio
1:2.8 f = 28.63  ω = 37.6°  $f_B$ = 36.80

| 14 | −30.186 |

$$\frac{f}{f_{I \cdot II}} = -1.025$$

$$\frac{f_{I \cdot II}}{f_I} = 0.399$$

$$\frac{d_1 + d_2 + d_3 + d_4}{f} = 0.559$$

$$\frac{N_I + N_{II}}{2} = 1.553$$

$$\frac{f}{f_{I-IV}} = 1.156$$

$$\frac{f_{III \cdot IV}}{f_{III}} = 0.632$$

$$\frac{r_5}{f} = 1.045$$

$$\frac{d_{10}}{f} = 0.060$$

What is claimed is:

1. A small-size and high-performance wide-angle photographic lens system having seven lens elements grouped into seven lens components, including first and second components each consisting of negative meniscus lenses with convex surfaces directed to the object, a third component consisting of a positive lens having a large-curvature convex surface directed to the object, a fourth component consisting of a positive lens having a large-curvature convex surface directed to the image, a fifth component consisting of a biconcave negative lens, a sixth component consisting of a positive meniscus lens having a convex surface directed to the image, and a seventh component consisting of a positive lens, said lens system satisfying the following conditions:

$$-1.4 < \frac{f}{f_{I \cdot II}} < -0.9 \quad (1)$$

$$0.3 < \frac{f_{I \cdot II}}{f_I} < 0.65 \quad (2)$$

$$0.4 < \frac{d_1 + d_2 + d_3 + d_4}{f} < 0.8 \quad (3)$$

$$1.5 < \frac{N_I + N_{II}}{2} < 1.6 \quad (4)$$

$$1.0 < \frac{f}{f_{I-IV}} < 1.5 \quad (5)$$

$$0.4 < \frac{f_{III \cdot IV}}{f_{III}} < 0.75 \quad (6)$$

$$0.7 < \frac{r_5}{f} < 1.3 \quad (7)$$

$$0.02 < \frac{d_{10}}{f} < 0.1 \quad (8)$$

where
f is the focal length of the overall lens system,
$f_{I \cdot II}$ is the resultant focal length of the first and second components,
$f_I$ is the focal length of the first component,
$d_i$ is the thickness or spacing of the i-th lens,
$N_I$, $N_{II}$ are the refractive indexes of the first and second components at d-line,
$f_{I-IV}$ is the resultant focal length of the first through fourth components,
$f_{III \cdot IV}$ is the resultant focal length of the third and fourth components,
$f_{III}$ is the focal length of the third component, and
$r_i$ is the radius of curvature of the i-th lens surface.

2. The lens system claimed in claim 1, further satisfying the following chart:

aperture ratio
1:2.8 f = 28.78  ω = 37.6°  $f_B$ = 36.79

|  | No. | r | d | N | ν |
|---|---|---|---|---|---|
| $L_1$ | 1 | 38.000 | 1.40 | 1.58913 | 61.0 |
|  | 2 | 16.614 | 6.46 |  |  |
| $L_2$ | 3 | 34.000 | 1.30 | 1.51633 | 64.1 |
|  | 4 | 14.850 | 7.17 |  |  |
| $L_3$ | 5 | 25.674 | 4.50 | 1.70000 | 48.1 |
|  | 6 | −151.327 | 4.62 |  |  |
| $L_4$ | 7 | 94.860 | 4.75 | 1.65844 | 50.9 |
|  | 8 | −28.090 | 4.00 |  |  |
| $L_5$ | 9 | −17.929 | 3.33 | 1.76182 | 26.6 |
|  | 10 | 48.280 | 1.19 |  |  |
| $L_6$ | 11 | −33.552 | 2.40 | 1.69350 | 53.2 |
|  | 12 | −16.160 | 0.10 |  |  |
| $L_7$ | 13 | −1141.732 | 2.50 | 1.69350 | 53.2 |
|  | 14 | −30.500 |  |  |  |

$$\frac{f}{f_{I \cdot II}} = -1.186$$

$$\frac{f_{I \cdot II}}{f_I} = 0.47$$

$$\frac{d_1 + d_2 + d_3 + d_4}{f} = 0.567$$

$$\frac{N_I + N_{II}}{2} = 1.553$$

$$\frac{f}{f_{I-IV}} = 1.302$$

$$\frac{f_{III \cdot IV}}{f_{III}} = 0.597$$

$$\frac{r_5}{f} = 0.892$$

$$\frac{d_{10}}{f} = 0.041$$

3. The lens system claimed in claim 1, further satisfying the following chart:

aperture ratio
1:2.8 f = 28.63  ω = 37.6°  $f_B$ = 36.80

|  | No. | r | d | N | ν |
|---|---|---|---|---|---|
| $L_1$ | 1 | 30.000 | 1.52 | 1.58913 | 61.0 |
|  | 2 | 17.006 | 4.53 |  |  |
| $L_2$ | 3 | 32.000 | 1.40 | 1.51633 | 64.1 |
|  | 4 | 14.000 | 8.55 |  |  |

-continued aperture ratio
1:2.8 f = 28.63  ω = 37.6°  $f_B$ = 36.80

| | | | | | |
|---|---|---|---|---|---|
| | 5 | 29.920 | 3.83 | 1.74400 | 44.7 |
| $L_3$ | | | | | |
| | 6 | −103.398 | 4.36 | | |
| | 7 | −460.000 | 4.40 | 1.74400 | 44.7 |
| $L_4$ | | | | | |
| | 8 | −27.625 | 3.66 | | |
| | 9 | −18.660 | 3.66 | 1.80518 | 25.4 |
| $L_5$ | | | | | |
| | 10 | 56.177 | 1.73 | | |
| | 11 | −42.690 | 2.40 | 1.69680 | 55.5 |
| $L_6$ | | | | | |
| | 12 | −16.750 | 0.10 | | |
| | 13 | −487.370 | 2.50 | 1.69350 | 53.2 |
| $L_7$ | | | | | |
| | 14 | −30.186 | | | |

$$\frac{f}{f_{I\text{-}II}} = -1.025$$

-continued aperture ratio
1:2.8 f = 28.63  ω = 37.6°  $f_B$ = 36.80

$$\frac{f_{I\text{-}II}}{f_I} = 0.399$$

$$\frac{d_1 + d_2 + d_3 + d_4}{f} = 0.559$$

$$\frac{N_I + N_{II}}{2} = 1.553$$

$$\frac{f}{f_{I\text{-}IV}} = 1.156$$

$$\frac{f_{III\text{-}IV}}{f_{III}} = 0.632$$

$$\frac{r_5}{f} = 1.045$$

$$\frac{d_{10}}{f} = 0.060$$

* * * * *